M. PANTIGA.
HAND RAKE.
APPLICATION FILED SEPT. 30, 1921.
1,435,492.
Patented Nov. 14, 1922.
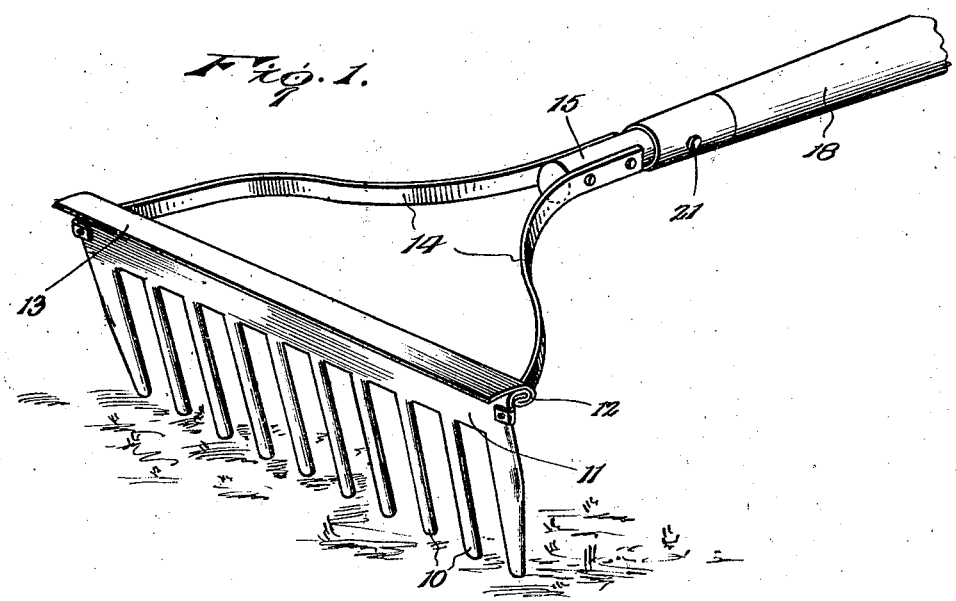
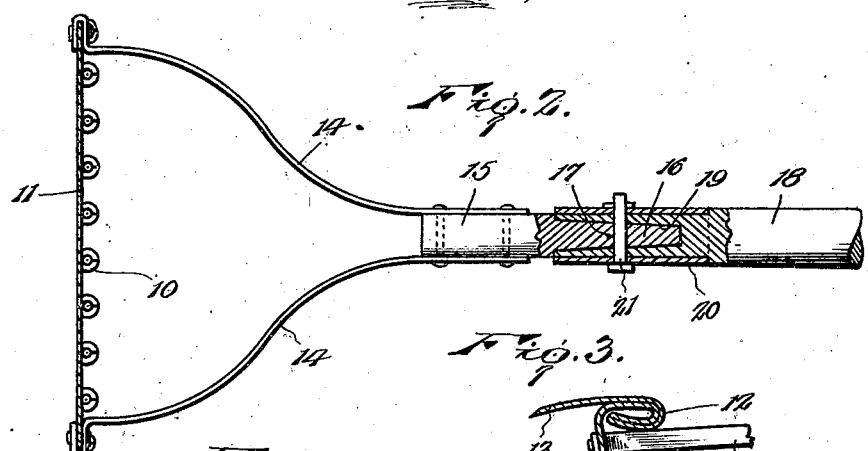
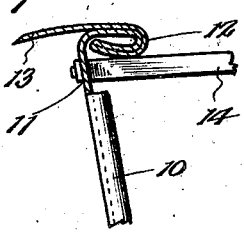
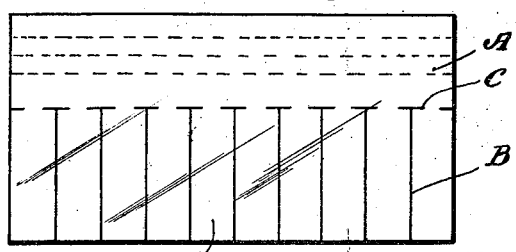
Inventor
M. Pantiga.
By Lacey & Lacey, Attorneys Patented Nov. 14, 1922.

1,435,492

UNITED STATES PATENT OFFICE.

MANUEL PANTIGA, OF SANTA PAULA, CALIFORNIA.

HAND RAKE.

Application filed September 30, 1921. Serial No. 504,309.

*To all whom it may concern:*

Be it known that I, MANUEL PANTIGA, citizen of Spain, residing at Santa Paula, in the county of Ventura and State of California, have invented certain new and useful Improvements in Hand Rakes, of which the following is a specification.

This invention relates to an improved hand rake and has as one of its principal objects to provide a device of this character embodying a cutting blade so that, in the practical use of the device, the rake may simply be turned over for bringing the blade into position for use.

A further object of the invention is to provide a rake wherein the rake head and teeth as well as the cutting blade will be formed from a single piece of material and wherein the rake head will be reinforced at the junction between the head and the blade.

And the invention has a still further object to provide a device wherein the rake may be readily detached from the handle therefor but wherein the rake will be firmly held against accidental disengagement from the handle as well as turning movement thereon.

Other and incidental objects will appear hereinafter.

In the drawing:

Figure 1 is a perspective view of my improved rake,

Figure 2 is a sectional view particularly illustrating the mounting of the rake upon the handle therefor, Figure 3 is an enlarged vertical section particularly illustrating the manner in which the cutting blade is formed on the rake head, and Figure 4 is a detail elevation showing the blank from which the rake head and cutting blade are formed.

In carrying the invention into effect, the rake head of the device with its integral teeth as well as the cutting blade provided upon the rake head are preferably formed from a metallic blank A of the character illustrated in Figure 4 of the drawing. This blank is preferably stamped from suitable resilient sheet metal and is oblong in general contour, the lower longitudinal margin of the blank being provided with a series of spaced transversely extending slits B. These slits are parallel and at the upper ends thereof, as well as at the end edges of the blank, said blank is further provided with short longitudinally directed slits C. A plurality of teeth forming members D is thus defined at the lower margin of the blank and, as best brought out in Figure 2, the opposite longitudinal margins of each of these members are rolled toward each other to provide a plurality of tubular rake teeth 10 integrally joined by the intermediate portion of the blank which forms the head 11 of the rake. As best brought out in Figure 3, the upper margin of the blank is bent into overlapping relation when the overlapped portion thereof is turned rearwardly and again bent under forwardly to abut the rake head. A reinforcing rib 12 is thus provided at the upper edge of the rake head extending from end to end thereof while the free upper edge portion of the blank is brought into horizontal position to provide a horizontally disposed forwardly directed cutting blade 13 overhanging the rake head. As will be perceived, this construction provides a very simple arrangement as well as a construction whereby the rake head with its cutting blade and reinforcing rib may be integrally formed of sheet metal. Bent at their forward ends around the end edges of the rake head are arms 14 which may be riveted or otherwise secured to the head. These arms converge toward their rear ends and mounted therebetween is a stock 15. The stock may be riveted or otherwise secured to the arms and, as best shown in Figure 2, is formed with a tapered rear end portion 16 through which is provided a tapered opening 17. In conjunction with the rake I employ a handle 18. This handle may be constructed of wood or other approved material and is provided at its forward end with a socket 19 about which is preferably arranged a ferrule 20. The socket is tapered to fit the rear end 16 of the stock 15 and removably fitting through the handle and through the ferrule 20 is a pin 21 extending through the opening 17 of the stock securing the rake upon the handle, the opening 17 being tapered, as previously indicated, in order that the pin may be readily fitted through said opening. Thus, the rake will be securely connected to the handle while, when desired, the rake may be readily detached therefrom.

In practice, my improved rake may, as suggested in Figure 1, be employed in the manner of an ordinary rake. However, as is well known, it is often desired, when raking, to uproot bunches of grass or sever weeds or the like. Accordingly, when this necessity arises, the rake may simply be turned over, when the cutting blade 13 will be brought into position for use. As will be perceived, after the cutting blade is rested against the ground, the rake may be readily manipulated for forcing the blade into the ground or against the vegetation to be cut for effecting the cutting operation. I accordingly provide a rake which will be found highly convenient in practical use.

Having thus described the invention, what is claimed as new is:

A rake constructed from a sheet metal blank having one margin thereof providing a cutting blade and having teeth formed from its opposite margin, a portion of the blank between said margins providing a head and the blank being bent into overlapping relation and folded at the rear of the head to define a reinforcing rib having said blade extending forwardly therefrom over the head.

In testimony whereof I affix my signature.

MANUEL PANTIGA. [L. S.]